May 3, 1949.  C. W. SINCLAIR  2,468,947
RIM
Filed March 26, 1945  2 Sheets-Sheet 1
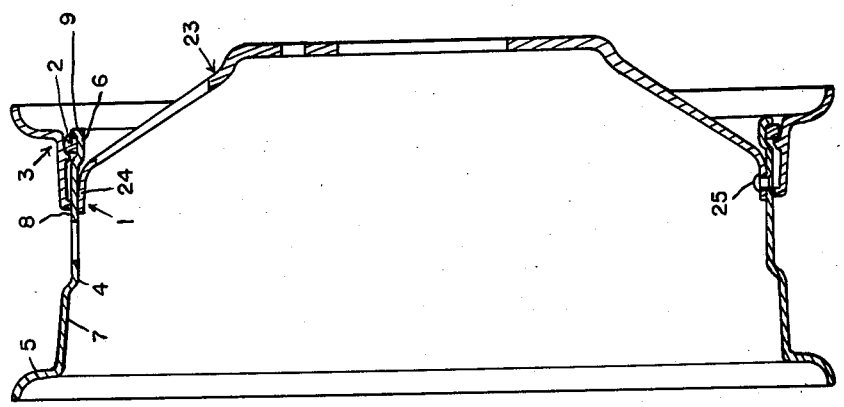
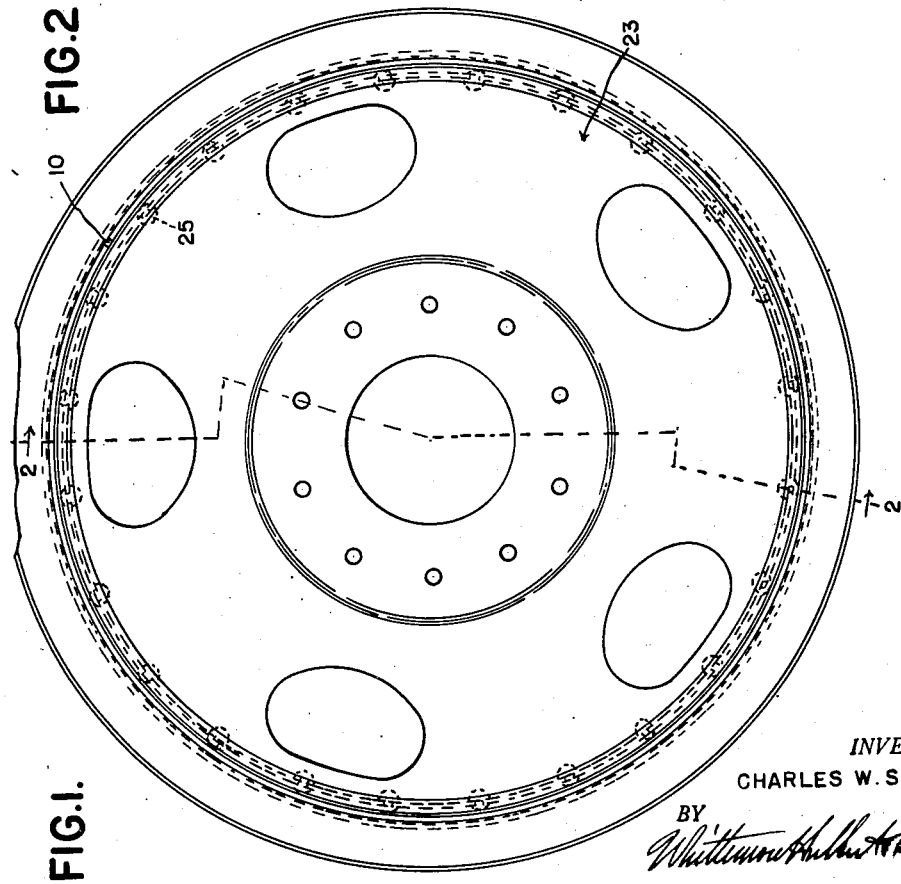
INVENTOR.
CHARLES W. SINCLAIR
BY
ATTORNEYS May 3, 1949.　　　C. W. SINCLAIR　　　2,468,947
RIM
Filed March 26, 1945　　　　　　　　　　　　2 Sheets-Sheet 2
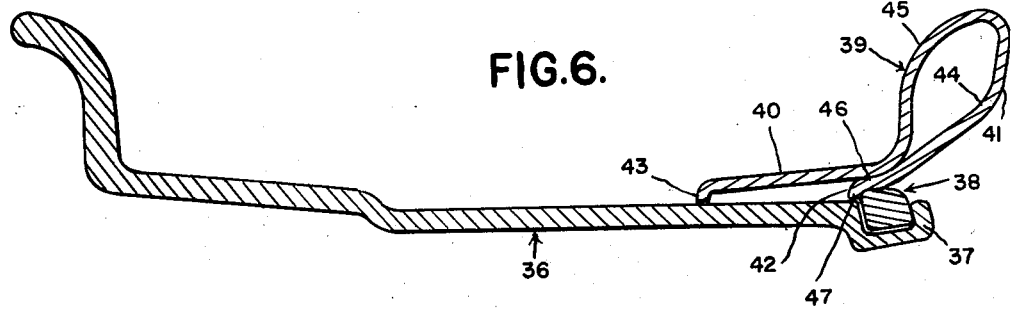
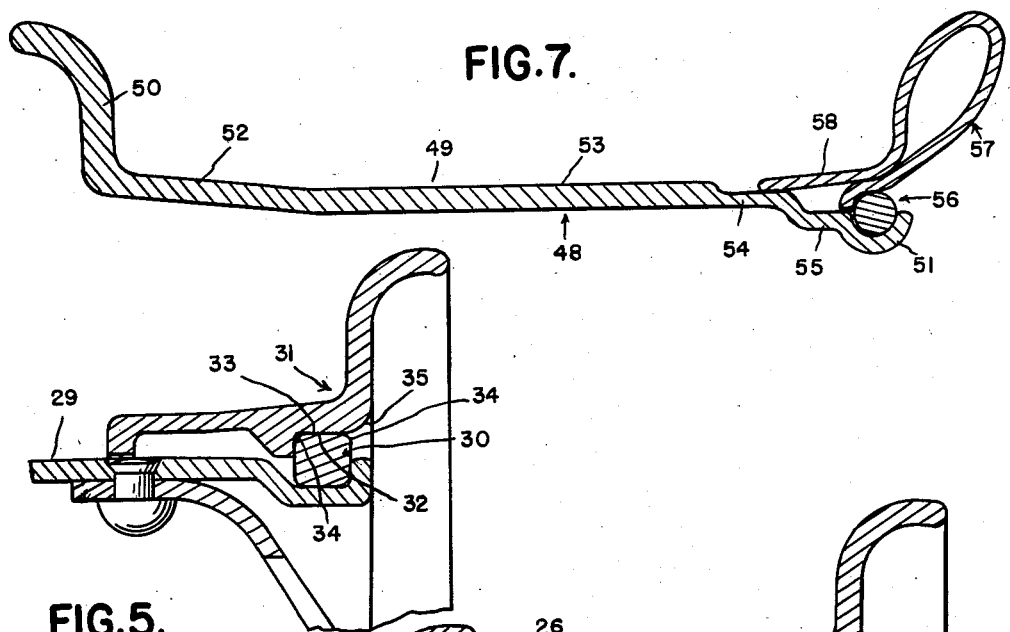
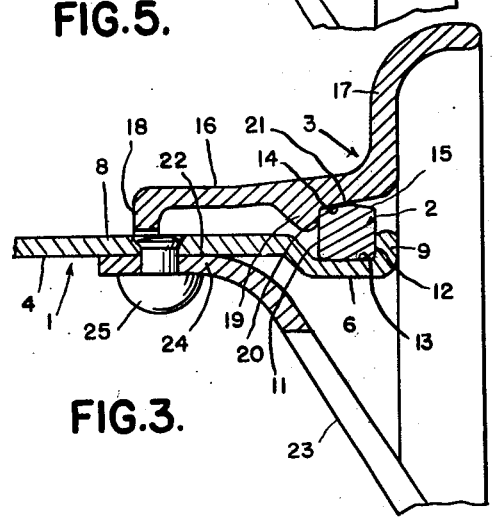
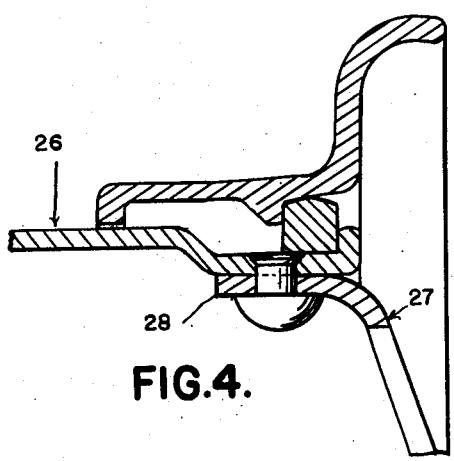
INVENTOR.
CHARLES W. SINCLAIR
BY
ATTORNEYS Patented May 3, 1949

2,468,947

UNITED STATES PATENT OFFICE 2,468,947

RIM

Charles W. Sinclair, Detroit, Mich., assignor to Kelsey-Hayes Wheel Company, Detroit, Mich., a corporation of Delaware Application March 26, 1945, Serial No. 584,757

4 Claims. (Cl. 152—410)

The invention relates to rims and refers more particularly to pneumatic tire carrying rims of that type employing a detachable tire retaining ring.

The invention has for one of its objects to provide an improved rim which is constructed to facilitate mounting and demounting of the tire and to effectively retain the tire when mounted on the rim.

The invention has for other objects to provide an improved rim comprising an endless annular base member, an endless tire retaining ring member and a clamping ring member between the base member and the tire retaining ring member, the members being constructed and arranged so that the clamping ring member partially converts the pressure exerted by a tire in an axial direction into pressure exerted against the base member and tire retaining ring member in a radial direction thereby effectively securing the parts to each other; and to provide an improved rim in which the base member, the tire retaining ring member and the clamping ring member form in effect a solid connection which is maintained by one of the first mentioned members being flexed by the clamping ring member.

The invention has for a further object to provide an improved rim in which the tire retaining ring member is constructed to be closely fitted by the associated bead of the tire casing and particularly by the radially inner face of the bead and the clamping ring compels flexure of the base member.

These and other objects of the invention will become apparent from the following description, taken in connection with the accompanying drawings, in which Figure 1 is an elevation of a wheel having a rim embodying the invention;

Figure 2 is a cross section on the line 2—2 of Figure 1;

Figure 3 is an enlarged view of a portion of Figure 2;

Figures 4, 5, 6 and 7 are views similar to Figure 3 showing modified constructions of rim.

In general, the rim is a pneumatic tire carrying rim forming part of a motor vehicle wheel. The rim illustrated in Figures 1, 2 and 3 comprises the annular base member 1, the detachable clamping ring 2 and the detachable tire retaining ring 3 retained by the clamping ring.

The base member 1 is endless and has the annular base 4, the annular tire retaining flange 5 extending generally radially outwardly from one edge of the base, and the annular gutter 6 at the other edge of the base. The base is formed with the annular portions 7 and 8 of different diameter with the annular portion 7 of greater diameter and forming a bead seat portion connecting into the tire retaining flange 5. The annular portion 8 of less diameter than the annular portion 7 extends axially between the annular portion 7 and the gutter 6, the external diameter of the bottom of the gutter being less than the external diameter of the annular portion 8. The axially outer side wall 9 of the gutter presents a substantially radial surface and has an external diameter which is preferably slightly less than the external diameter of the annular portion 8.

The clamping ring 2 is transversely split at one point 10 and has a section with radially extending axially inner and outer surfaces 11 and 12, an axially extending radially inner surface 13 and flared radially outer surfaces 14 and 15 which are inclined radially outwardly from the axially inner and outer surfaces. The construction is such that the clamping ring is symmetrically arranged with respect to its axially central radial plane so that the clamping ring is reversible. The clamping ring has an axial thickness which is less than the axial width of the gutter so that the gutter may readily accommodate the clamping ring.

The tire retaining ring 3 is endless and has the axially outwardly flared tire bead seat portion 16, the integral tire retaining flange portion 17 extending generally radially outwardly from the axially outer edge of the tire bead seat portion, and the integral generally radially inwardly extending parts 18 and 19 with the former located at the axially inner edge of the tire bead seat portion and the latter located near the axially outer edge of the tire bead seat portion and presenting a radially extending shoulder 20 for engagement by the axially inner face 11 of the clamping ring 2. The tire retaining ring also has the radially inner surface 21 which flares axially outwardly from its junction with the shoulder 20 preferably at the same angle as either of the surfaces 14 and 15 of the clamping ring. The parts 18 and 19 have internal diameters slightly greater than the external diameter of the annular portion 8 of the base and the part 18 telescopes over or encircles the annular portion, the part 19 is axially outwardly of the annular portion, the shoulder 20 abuts the surface 11, the surface 21 engages either the surface 14 or the surface 15 and the surface 13 engages the radially outer surface of the bottom wall of the gutter when the parts are in their operative positions. The radial dimensions of the clamping ring are greater than the normal radial distances between the surfaces of the gutter and tire retaining ring engaged by the clamping ring so that the clamping ring flexes either or both the base and tire retaining ring. With the construction as illustrated in Figures 1, 2 and 3, the tire retaining ring is made more strongly resistant to radial flexure than the base so that the tire retaining ring maintains its dimensions and acts through the clamping ring to compel flexure of the base axially outwardly of its zone of connection at 22 with the wheel body 23 which, as illustrated, is a tapered disc having an axially extending peripheral flange 24 secured to the rim by suitable means, such as the rivets 25.

With this construction of rim, the tire may be readily and easily mounted on the rim, during which time the tire retaining ring 3 and the clamping ring 2 are removed. It will be noted that the annular bead seat portion 7 of the rim base I may be tightly fitted by the radially inner face of the axially inner bead of the tire casing to thereby eliminate rocking of the axially inner tire bead on the tire bead seat portion. The tire retaining ring may then be readily mounted on the rim base and inserted within the axially outer bead of the tire casing, it being noted that the construction is such that the radially inner face of this bead may also tightly fit the tire bead seat portion of the tire retaining ring. While the tire retaining ring is in an axially inner position to clear the clamping ring the latter may be inserted into the gutter with the surface 12 engaging the gutter side wall 9 after which the tire retaining ring may be moved to its axially outer position over the clamping ring by inflation of the inner tube of the tire. During the axially outward movement of the tire retaining ring it maintains its dimensions and acts through the clamping ring to compel radial flexure of the rim, base, including the gutter, the axial pressure exerted by the tire being partially converted into radial pressure exerted by the clamping ring. As illustrated, the angle of the contacting surfaces of the tire retaining ring and clamping ring is such that the radial component of pressure is much greater than the axial component, the angle being approximately 12 degress. It will be noted that the clamping ring is wedged radially inwardly until the shoulder 20 engages the surface 11, at which time the clamping ring definitely positions the tire retaining ring axially relative to the base. Also at this time a solid connection is, in effect, formed between the base, the clamping ring and the tire retaining ring.

Figure 4 illustrates a modification of wheel in which the rim 26 is constructed in substantially the same manner as the rim I and the wheel body 27 differs from the wheel body 23 mainly in being dished to a less extent and having its axially extending peripheral flange 28 fixedly secured to the rim by being riveted against the radially inner face of the bottom wall of the gutter of the rim. With this construction the clamping ring flexes both the tire retaining ring and the base of the rim and also the outer peripheral portion of the wheel body, the amount of flexing depending upon the relative strengths of the parts. In any event, it will be noted that upon inflation of the tire its axial pressure is partially converted into radial pressure exerted by the clamping ring to form, in effect, a solid connection between the base, the clamping ring and the tire retaining ring of the rim and effectively secure the parts in operative position.

In the modification illustrated in Figure 5, the endless annular base member 29 is constructed in the same manner as the endless annular base member I. However, the transversely split clamping ring 30 and the endless tire retaining ring 31 are of different constructions than the clamping ring 2 and the tire retaining ring 3, the clamping ring 23 and the tire retaining ring 24 having axially extending surfaces 32 and 33, respectively, for engagement in the operative position of the parts. In this modification wedging of the clamping ring by the tire retaining ring is secured by rounding the corners 34 of the clamping ring and the corner or junction 35 of the tire retaining ring.

With this construction it will be noted that the tire may be readily mounted or demounted and also that during inflation the tire retaining ring is moved axially outwardly and acts on the clamping ring to compel flexure of the portion of the rim base axially outwardly of its zone of connection with the wheel body.

Figure 6 illustrates another modification of rim in which the annular base member 36 is formed in substantially the same manner as the annular base members of the rim of Figures 1, 2 and 3. However, the bottom wall of the annular gutter 37 is inclined radially and axially outwardly and the transversely split clamping ring 38 is of approximately square cross section with its radially inner face inclined at substantially the same angle as the bottom wall of the gutter. Also the tire retaining ring 39 is endless and formed of one piece of sheet metal, preferably of uniform gauge. The tire retaining ring has the tire bead seat portion 40, the hollow return-bent tire retaining flange portion 41 connecting into the seat portion, and the supporting portion 42 connecting into the flange portion. The seat portion flares axially outwardly from its axially inner edge which is provided with the generally radially extending part 43 having an internal diameter to freely telescope over or encircle the reduced annular portion of the rim base. The axially outer wall 44 of the flange portion 41 abuts the axially inner wall 45 of the flange portion at the juncture of the latter with the seat portion. The supporting portion 42 has the generally axially extending part 46 which fits and engages the radially inner face of the seat portion and also has the generally radially extending part 47 which forms a generally radial face or shoulder for engagement by the axially inner face of the clamping ring 38. The generally radially extending part 47, it will be noted, clears the reduced annular portion of the base.

The construction is such that the tire may be readily mounted on or removed from the annular base member. Also during the inflation of the tire the endless tire retaining ring acts on the clamping ring to compel flexure of the rim base. Furthermore, the tire retaining ring is formed of sheet metal and shaped to have the necessary strength with the minimum weight.

In the modification illustrated in Figure 7, the endless annular base member 48 has the annular base 49, the annular tire retaining flange 50 and the annular gutter 51, the gutter being of generally semi-circular cross section. The base is formed with the seat portion 52 flared toward and connecting into the tire retaining flange 50, the axially extending annular portion 53 leading from the seat portion and the axially extending annular portions 54 and 55 between the annular portion 53 and the gutter 51. The annular portion 54 has an external diameter less than that of the annular portion 53 and the annular portion 55 has an external diameter less than that of the annular portion 54. The annular portions 54, 55 and also the gutter 51 preferably are of a thickness less than that of the annular portion 53 and the axially outer wall of the gutter terminates so that its radially outer face has an external diameter preferably slightly less than that of the annular portion 55. The construction is such that the annular portion 55 is radially inwardly offset relative to the annular portion 54 and serves with the gutter 51 to reinforce the base. The clamping ring 56 is a transversely split ring of circular cross section of slightly smaller radius than that of the gutter. The detachable endless tire retaining ring 57 is formed in one piece of sheet metal, preferably of uniform gauge, and has a construction very similar to that of the tire retaining ring shown in Figure 6. It differs, however, mainly in that the axially outwardly flared tire seat portion 58 telescopes directly over or encircles the annular portion 53 of the base.

In this construction the portion of the rim base axially outwardly of its zone of connection with the wheel body is flexed by the tire retaining ring acting through the clamping ring, the diameter of the circular cross section of the clamping ring being greater than the normal radial distance between the bottom of the gutter and the portion of the tire retaining ring engaged by the clamping ring.

What I claim as my invention is:

1. In a rim, an endless annular base member having an annular gutter at one edge provided with an annular wall presenting a substantially radial surface, a detachable endless tire retaining ring member movable over said base member and having an annular tire bead seat portion extending over and encircling said base member and a tire retaining flange portion extending generally radially outwardly from the axially outer edge of said tire bead seat portion, said tire bead seat portion being provided with a generally radially inwardly extending part presenting a substantially radial shoulder and a radially inner surface flaring axially outwardly from its junction with said shoulder, and a transversely split clamping ring member extending within said gutter and located between said base member and tire retaining ring member and having generally radially facing surfaces engaging said base member and tire retaining ring member and also abutting said substantially radial surface and shoulder, said clamping ring member being symmetrically arranged with respect to its axially central radial plane and having a flared radially outer surface inclined to substantially the same angle as and engaging said flared radially inner surface, the minimum and maximum radial sectional dimensions of said clamping ring member between said generally radially facing surfaces before assembly of said base and tire retaining ring members being greater than the minimum and maximum distances respectively between the bottom of said gutter and the portion of said flared radially inner surface engaged by said clamping ring member.

2. In a rim, an endless annular base member having an annular gutter at one edge provided with an annular wall presenting a substantially radial surface, a detachable endless tire retaining ring member having an annular tire bead seat portion extending over and encircling said base member and provided with a generally radially inwardly extending part presenting a substantially radial shoulder and with a radially inner surface axially outwardly of said shoulder, and a transversely split clamping ring member extending within said gutter and located between said base member and tire retaining ring member and having generally radially facing surfaces engaging said base member and tire retaining ring member and also abutting said substantially radial surface and shoulder, said clamping ring member engaging the bottom of said gutter and said radially inner surface and having minimum and maximum radial sectional dimensions between said generally radially facing surfaces, before assembly of said base and tire retaining ring members, greater than the differences in radii between the bottom of said gutter and the portion of said radially inner surface engaged by said clamping ring member.

3. In a rim, an endless annular base member provided with an annular wall presenting a substantially radial surface, a detachable endless tire retaining ring member encircling said base member and having a generally radially inwardly extending part presenting a substantially radial shoulder and a transversely split clamping ring member between said base member and tire retaining ring member and abutting said substantially radial surface and shoulder and having radial wedging engagement with one of said first mentioned members, the minimum and maximum radial sectional dimensions of said clamping ring member before assembly of said base member and tire retaining ring member being greater than the minimum and maximum radial distances respectively between the portions of the surfaces of said base member and tire retaining ring member engaged by said clamping ring member in the operative position of said base, tire retaining ring and clamping ring members.

4. In a rim, an endless annular base member, a detachable endless tire retaining ring member movable over said base member and having an annular tire bead seat portion extending over and encircling said base member and a tire retaining flange portion extending generally radially outwardly from said tire bead seat portion, and a transversely split clamping ring member located between and engaging said base member and tire retaining ring member, said clamping ring member being symmetrically arranged with respect to its axially central radial plane and having a minimum radial sectional dimension greater before assembly of said base member and tire retaining ring member than the minimum radial distance between the portions of the surfaces of said base member and tire retaining ring member engaged by said clamping ring member, and cooperating substantially radially extending means on said base member and tire retaining ring member engaging said clamping ring member to limit axial movement of said tire retaining ring member over said clamping ring member relative to said base member.

CHARLES W. SINCLAIR.

REFERENCES CITED

The following references are of record in the file of this patent:

UNITED STATES PATENTS

| Number | Name | Date |
|---|---|---|
| 772,209 | Bryant | Oct. 11, 1904 |
| 853,058 | Bryant | May 7, 1907 |
| 1,493,040 | Klaus | May 6, 1924 |
| 1,675,630 | Ash | July 3, 1928 |

FOREIGN PATENTS

| Number | Country | Date |
|---|---|---|
| 25,678 | Great Britain | 1907 |
| 39,779 | Netherlands | 1937 |
| 443,322 | Great Britain | 1936 |
| 627,235 | Germany | 1936 |
| 642,764 | France | 1928 |
| 741,853 | France | 1932 |